(12) United States Patent
Yoneoka et al.

(10) Patent No.: US 9,983,696 B2
(45) Date of Patent: May 29, 2018

(54) FORCE-SENSING STYLUS FOR USE WITH ELECTRONIC DEVICES

(71) Applicant: Apple Inc., Cupertino, CA (US)

(72) Inventors: Shingo Yoneoka, Cupertino, CA (US); Brenton A. Baugh, Cupertino, CA (US); Aidan N. Zimmerman, Cupertino, CA (US); Jonah A. Harley, Cupertino, CA (US); Storrs T. Hoen, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 59 days.

(21) Appl. No.: 14/867,522

(22) Filed: Sep. 28, 2015

(65) Prior Publication Data

US 2016/0188013 A1  Jun. 30, 2016

Related U.S. Application Data

(60) Provisional application No. 62/057,988, filed on Sep. 30, 2014.

(51) Int. Cl.
*G06F 3/044* (2006.01)
*G06F 3/0354* (2013.01)
*G06F 3/041* (2006.01)
*G06F 3/038* (2013.01)

(52) U.S. Cl.
CPC ........ *G06F 3/03545* (2013.01); *G06F 3/0383* (2013.01); *G06F 3/044* (2013.01); *G06F 3/0414* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 4,883,926 A | 11/1989 | Baldwin | |
| 5,414,227 A | 5/1995 | Schubert et al. | |
| 5,981,883 A * | 11/1999 | Shriver | G01L 5/00 178/18.01 |
| 8,878,824 B2 | 11/2014 | Besperstov | |
| 9,483,127 B2 | 11/2016 | Obata | |
| 2005/0156912 A1 | 7/2005 | Taylor et al. | |
| 2008/0128180 A1 | 6/2008 | Perski et al. | |
| 2008/0309645 A1 * | 12/2008 | Wang | G06F 1/1632 345/179 |
| 2014/0028634 A1 * | 1/2014 | Krah | G06F 3/041 345/179 |
| 2016/0188013 A1 | 6/2016 | Yoneoka et al. | |

FOREIGN PATENT DOCUMENTS

EP          0182144          5/1986

* cited by examiner

*Primary Examiner* — Nicholas J Lee
*Assistant Examiner* — Duane N Taylor, Jr.
(74) *Attorney, Agent, or Firm* — McDermott Will & Emery LLP

(57) ABSTRACT

Embodiments disclosed herein relate generally to a stylus for use with a portable electronic device. The stylus includes a force sensing device to measure three dimensional force components exerted by the stylus on the portable electronic device. The output of the portable electronic device is adjusted based upon the force components.

12 Claims, 8 Drawing Sheets

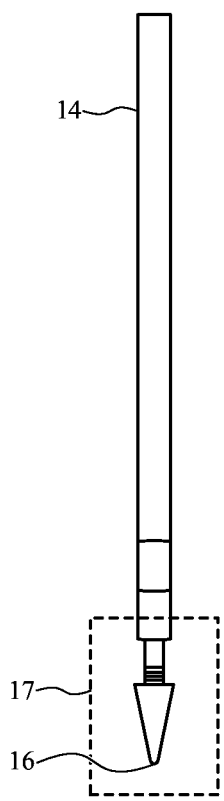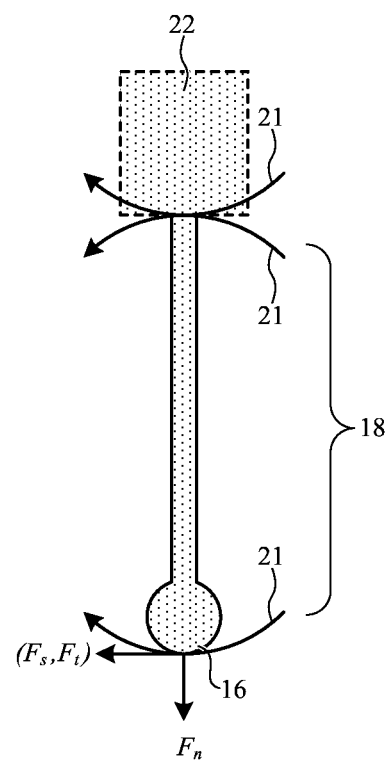
FIG. 4  FIG. 5

FORCE-SENSING STYLUS FOR USE WITH ELECTRONIC DEVICES

CROSS-REFERENCE TO RELATED APPLICATION

This application is a nonprovisional patent application of and claims the benefit to U.S. Provisional Patent Application No. 62/057,988, filed Sep. 30, 2014 and titled "Force Sensing Stylus," the disclosure of which is hereby incorporated herein by reference in its entirety.

FIELD

Embodiments disclosed herein relate generally to a stylus for providing input to a computing device, and more particularly to a stylus capable of sensing and measuring force exerted by the stylus on a surface.

BACKGROUND

Many people use a stylus when interacting with touch-sensitive computing devices. Styli permit data entry and inputs into touch-sensitive computing devices; certain users prefer using a stylus to using their fingers.

Typical styli, however, are limited in the type and accuracy of input they can provide. Generic styli lack any sensing capability and instead rely on the touch sensing capability of the electronic device with which they interact. Some styli can sense a force exerted by a user on the tip of the stylus, but most are limited to single-axis force sensing. That is, such styli can sense only a magnitude of force exerted along an axis parallel to the axis of the stylus.

Generally, single-component force sensing may not provide especially useful input when the stylus is held at an angle other than perpendicularly to the input surface. Any non-right angle between stylus and input surface may cause the measurement of force applied to the input surface to be inaccurate. Further, single-force styli are inherently limited in the number and variety of inputs that may be provided to an electronic device.

Accordingly, there may be a need for a force-sensing stylus that can sense force along multiple axes.

SUMMARY

A stylus is disclosed which includes an apparatus and system for detecting the amount of force exerted by a user on a touch-sensitive surface or other surface and, in particular, with respect to a portable electronic device. The stylus may include a force sensor contained within or attached to the stylus which senses the force exerted by a user in three dimensions on a surface over which the stylus is moved. The sensor may be contained within the stylus or may otherwise be associated with the stylus.

One embodiment utilizes a strain gauge in a stylus to sense force exerted by a user using a stylus in both axial and radial vectors. By sensing the force vectors, the amount of force sensed by the touch-sensitive surface in a portable electronic device may be adjusted such that the quality of a line made by the user with the stylus may be adjusted to be uniform. That is, the force sensor may compensate for uneven force vectors so as to make the touch-sensitive surface sensors generate a uniform line image on the touch-sensitive surface. The determination of the force vectors may also be useful in other functions of the stylus. For example, the force exerted against a touch-sensitive surface may be used to turn the touch-sensitive surface on and off. Accurate determination of the axial force vector against the touch-sensitive surface results in more accurate determination of the intent of the user as to turning the device on or off.

In another embodiment of the device, the sensed force may be stored in the portable electronic device. The data storage device could be contained within the stylus or in a laptop computer or electronic tablet or other suitable device which may store the sensed data. The sensed data may be communicated to the data storage device wirelessly or through a direct connection to the stylus.

BRIEF DESCRIPTION OF THE DRAWINGS

FIG. 4 illustrates one embodiment of a stylus;

FIG. 5 illustrates a tip portion of a stylus;

DETAILED DESCRIPTION

Figure 1:
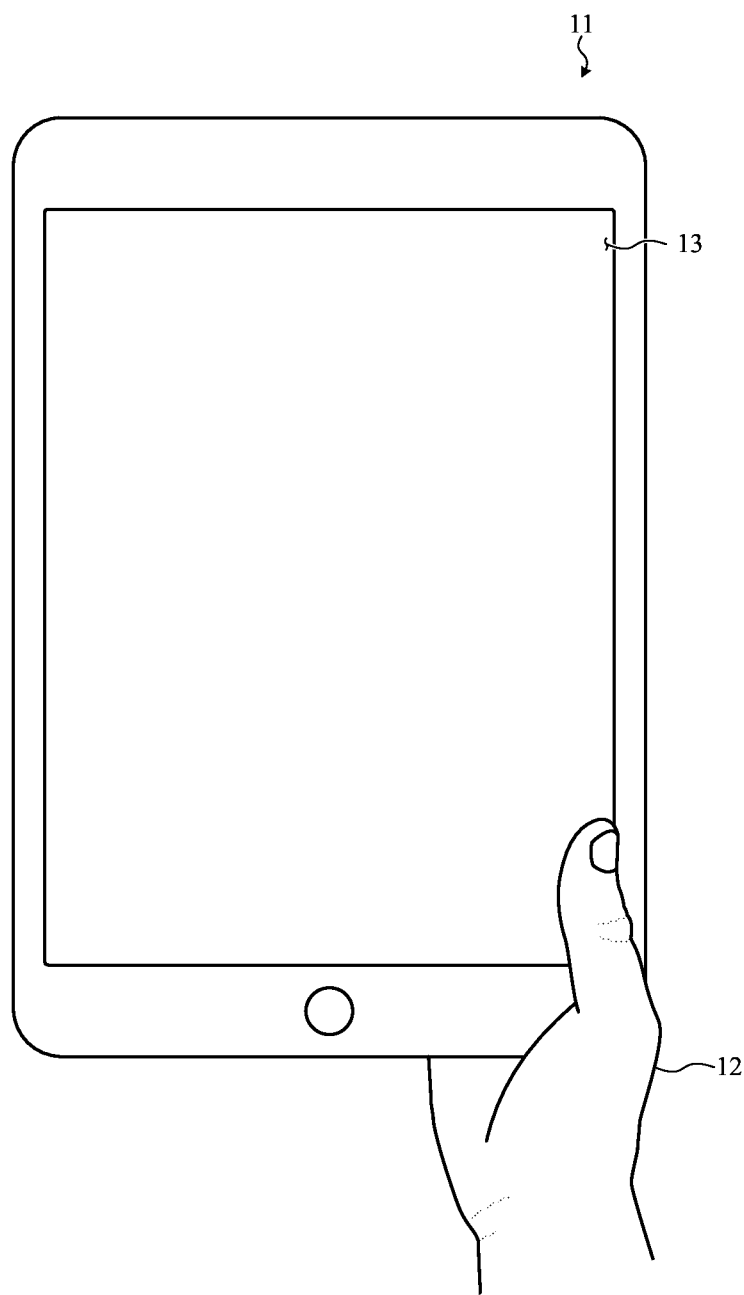
FIG. 1 is a illustrates a portable electronic device held by a user.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims. Those skilled in the art will readily appreciate that the detailed description given herein with respect to these Figures is for explanatory purposes only and should not be construed as limiting. Like reference numerals denote like structure throughout each of the various figures.

Referring to the figures, FIG. 1 is a perspective view of an electronic device 11 held by a user 12. Electronic device 11 is illustrated as a tablet computing device, but it should be appreciated that any suitable electronic device may be used in or with various embodiments, including a mobile phone, a wearable computing device (such as a watch, glasses, jewelry, a band and so on), a laptop or other portable computer, a display, a touch-sensitive surface, and so forth.

Figure 2:
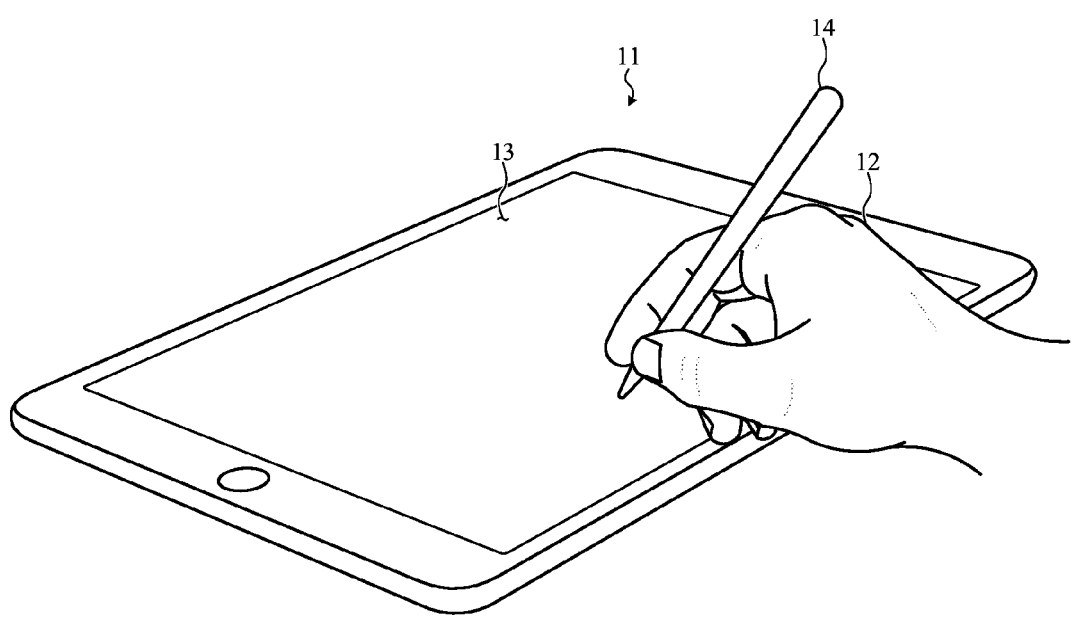
FIG. 2 illustrates a stylus contacting a portable electronic device.

FIG. 2 is a perspective view of electronic device 11, showing a stylus 14 contacting touch-sensitive surface 13. Stylus 14 may be used to provide input to electronic device 11, for example, through interaction with touch-sensitive surface 13. Touch-sensitive surface may sense the touch of the stylus, which in turn may be interpreted as an input to the electronic device 11.

The usefulness of stylus 14 in various applications may be affected by the force exerted on touch-sensitive surface by stylus 14. For example, the width of a line generated on screen 13 may be dependent upon the force which is sensed by touch-sensitive surface 13 and exerted by user 12 in creating that line. In such an example, more force exerted by the stylus 14 may result in a wider line while less force may result in a narrower line. Many touch-sensitive surfaces 13 do not sense any force exerted thereon. However, it may be useful for the stylus 14 itself to be able to sense multi-axial forces it is applying to the touch-sensitive surface or other input surface.

The orientation of stylus 14 with respect to input surface 13 may play a role in determining exerted force. If stylus 14 is held near perpendicular to screen 13 virtually all the force exerted by user 12 is transferred to stylus 14 through tip 16. By contrast, when stylus 14 is held at an angle to screen 13 (as shown in FIG. 2), only one component of the force exerted by user 12 on stylus 14 would be sensed by any single-axis force-sensing stylus, namely the force vector extending through tip 16. Since the other vectors of the exerted force extend in directions parallel to screen surface 13, single-axis force-sensing styli cannot sense these vectors. Likewise, even if input surface 13 is force-sensitive, it may not sense these vectors.

Figure 3:
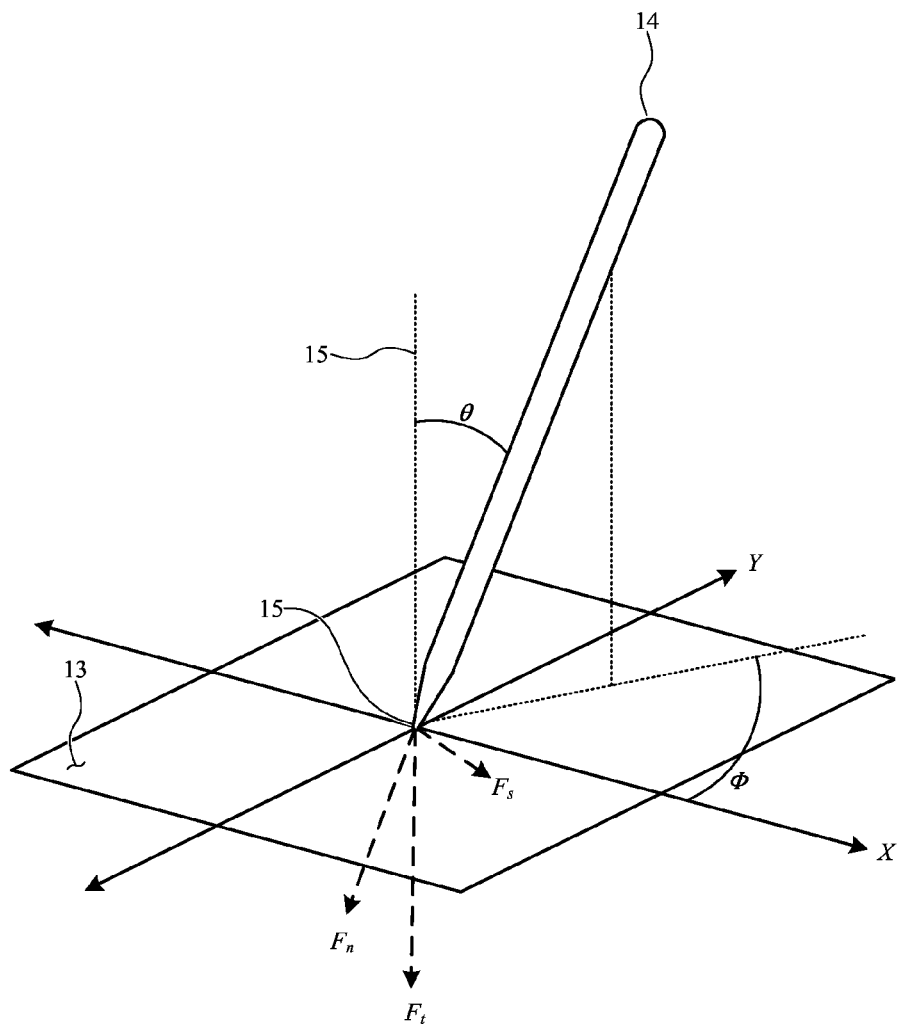
FIG. 3 depicts a stylus contacting a surface and showing force vectors exerted by the stylus on the surface.

Referring to FIG. 3, a simplified stylus 14 is shown in contact with touch-sensitive surface 13. Stylus 14 is positioned at an angle θ from axis 15, which is perpendicular to surface 13. In certain embodiments, the stylus 14 may detect a force (Fn) exerted axially with respect to tip 16 (e.g., along vector Fn), parallel to the axis of the stylus 14. However, as can be seen from FIG. 3, there are additional force components (Ft and Fs) exerted on tip 16 and that can be measured by the current stylus 14. By measuring additional force components, Ft and Fs, three-dimensional force vectors can be determined with respect to tip 16. A rotational angle component ø can be measured given known values for the three-dimensional force vectors Fn, Ft, and Fs.

Further, by measuring three-dimensional force components, uniform force sensitivity over all tilt angles θ is enhanced. In addition, force measurement errors due to tilt θ and rotation ø angles are reduced. Measuring force in three may reduce or minimize certain limitations experienced by single-axis force sensing styli.

Thus, sensitivity and accuracy of force measurement by the stylus 14 may be enhanced through the use of multi-axial force sensors. Sensitivity and accuracy may be particularly enhanced when the stylus is positioned at a large tilt angle θ with respect to the input surface 13, as the measured force for a one-axis sensor may be skewed by frictional force. Generally, frictional force between the stylus 14 and input surface 13 may increase as the tilt angle θ increases.

While inclusion of a three axis force sensor in a stylus may provide useful qualities, such inclusion may also present certain design challenges. Oftentimes, a stylus is relatively thin and long to mimic the look and feel of a typical writing instrument, such as a pen or pencil, and also to provide a comfortable gripping surface for a user. However, the longer the length and narrower the diameter of the stylus 14, the more flexible it is along its length. Generally, flexibility of the stylus may complicate or interfere with force measurement, because the force may not be exerted axially on the tip 16. Thus, in some embodiments there may be a trade-off between the mechanical strength of stylus 14 and sensitivity of the force sensor.

FIG. 4 generally shows a stylus 14 having a long, narrow body coupled to a tip 16. FIG. 5 is a simplified representation of region 17 of the stylus 14 of FIG. 4, and specifically depicts a simplified mechanical model of the tip 16.

The relatively long distance 18 between tip 16 and force sensor 19 (which, in one embodiment, is about 20-30 mm) may make tip 16 sensitive to radial forces (Fs, Ft) representing radial force moments 21. A moment of force may be created when user 12 moves tip 16 along an input surface; the frictional resistance of tip 16 with respect to the surface 13 may cause rotation or displacement with respect to the longitudinal axis of stylus 14. Accordingly, it may be useful to either stiffen the tip structure 16 or to account for the bending of the tip when determining or measuring multi-axial force.

Figure 6:
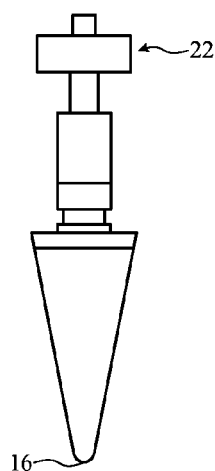
FIG. 6 illustrates a second view of the tip portion of a stylus.

FIG. 6 shows a side view of tip portion 16. Stylus tip 16 is connected to force sensor structure 22, shown in more detail in FIGS. 7 and 8. The force sensor structure 22 may generally measure the multi-axial forces exerted on tip 16 when it is in contact with an input surface.

Figure 7:
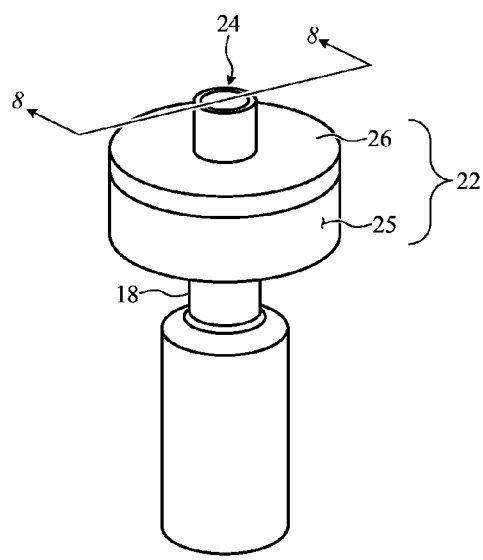
FIG. 7 illustrates a force sensor assembly.

Referring to FIG. 7, force sensor structure 22 is shown in a close-up view. A strain gauge assembly 23 is shown surrounding hollow core portion 24. In one embodiment, strain gauge assembly 23 may have a diameter from about 5 mm to about 20 mm. An exterior surface 25 of strain gauge assembly 23 is affixed to the interior housing surface of stylus 14. Hollow core portion 24 allows electrical connections to be made from tip 16 to strain gauge assembly 23 and, in some embodiments, to a transmitter or other components of portable electronic device 11.

Force sensor structure 22 may be constructed from membranes, tubes, or other surfaces by laser welding, thermal compression bonding, or diffusion bonding. Structure 22 could also be made by three dimensional printing technologies. The various components of structure 22 could be made from aluminum, stainless steel, titanium, beryllium, copper, a copper/titanium alloy or a combination of these or other metallic or other materials.

Figure 8:
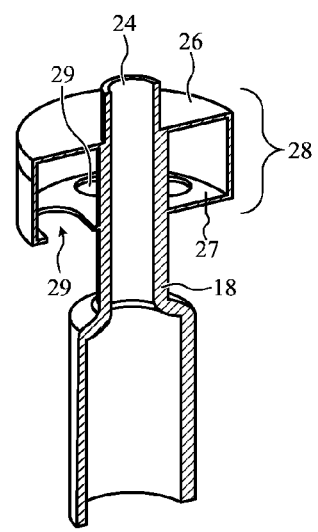
FIG. 8 is a cross-sectional view of the force sensor taken through line 8-8 in FIG. 7.

Referring to FIG. 8, a side sectional view of strain gauge structure 22 taken along line 8-8 of FIG. 7 is shown. Strain gauge assembly 23 includes a top membrane 26 and a bottom membrane 27. Top membrane 26 and bottom membrane 27 are separated by a predetermined distance 28 of a sidewall; this distance may, in one embodiment, be from 1-25 mm.

Bottom membrane 27 may increase the radial stiffness of force sensing structure 22. Bottom membrane 27 may be constructed from a flat plate, a beam, a corrugated material and so forth. Portions 29 of bottom membrane 27 may be removed to make membrane 27 somewhat flexible and reduce the overall stiffness of stylus 14. In some embodiments, top membrane 26 may also have cutouts (not shown) to improve sensitivity of the force measurement. Membranes 27 and 28 are compliant axially (z axis) but more rigid laterally (x-y axes) by this design. In alternate embodiments, lower membrane 27 could be an elastomeric material which is also more rigid in the x-y plane but more compliant along the z axis.

In some embodiments, tip 16 may include an electrode or other electrically active structure or material that may electrically and/or capacitively couple to touch-sensing structures in an input surface 13. Alternatively, the tip 16 may be doped or otherwise impregnated with a capacitive material so that a capacitive touch-sensing structure of the input surface 13 may detect a touch from the tip 16. In still other embodiments, the tip may be electrically inert and a resistive sensor may detect a touch from the stylus tip 16.

Figure 9:
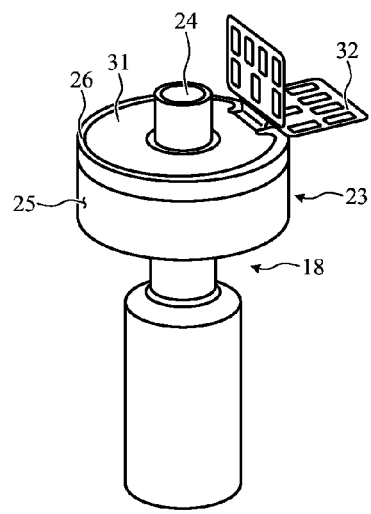
FIG. 9 illustrates a strain gauge assembly of the force sensor assembly.
Figure 10:
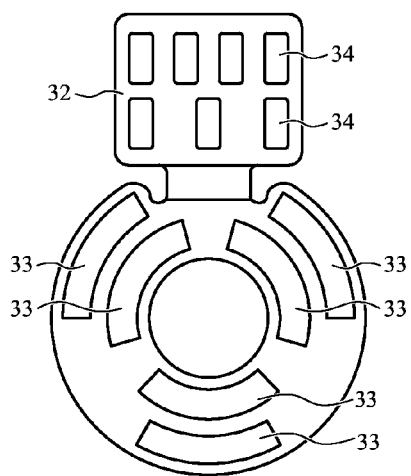
FIG. 10 illustrates one sample layout of individual strain gauges of the strain gauge assembly.

Referring to FIG. 9, force sensor structure 22 is shown in a detailed perspective view. Strain gauge assembly 23 is shown mounted on hollow core portion 24. Strain gauge assembly includes a strain gauge 31 mounted on top membrane 26. Pin grid array 32 of the strain gauge 31 may provide electrical connections from strain gauge to internal components of stylus 14 or electronic device 11. Referring to FIG. 10, strain gauge 31 is shown in greater detail with pin grid array 32 and six individual strain gauges 33. Each strain gauge 33 is electrically connected to a corresponding pin connection 34 on pin grid array 32.

Strain gauge 31, as shown in FIG. 10, includes six individual strain gauges 33 in one embodiment. It should be expressly understood that any number of strain gauges 33 may be included. Using six strain gauges reduces the number of connections and the complexity of the design of strain gauge 31.

The variation in temperature and resistance at pin grid array 32 may be compensated for with electrical design parameters known to one skilled in the art. Similarly, the Seebeck effect of electrical induction due to use of different materials may be compensated for by differential signal lines as known to one skilled in the art. Power savings may be achieved using higher resistive strain gauges 33.

Because strain gauge 31 provides a more linear signal than, for example a capacitive sensor, it improves the signal to noise ratio thereby requiring less digital signal processing which in turn reduces power requirements of the force sensor and overall apparatus. Strain gauge 31 is preferred in some embodiments because it provides a more accurate linear signal which is more sensitive than other force sensors. However, it should be expressly understood that other types of force sensors may be utilized in various embodiments. For example, a capacitive strain gauge could be used with top membrane 26 and bottom membrane 27 separated by resilient members such as springs or a gel material. The distance 28 between membranes 26 and 27 is known and any change in that distance can be measured by a change in capacitance measured between membranes 26 and 27.

Figure 11:
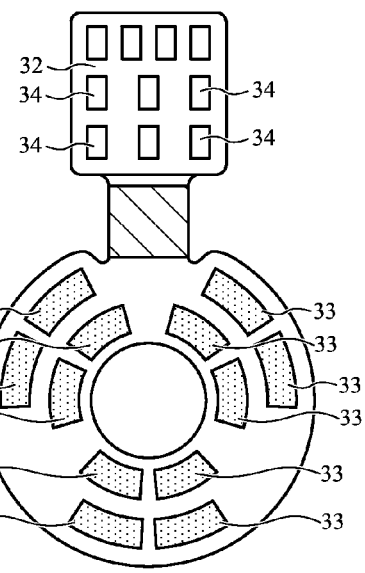
FIG. 11. illustrates an alternate strain gauge layout.

Referring to FIG. 11, in an alternate embodiment, a strain gauge design 31 may include 12 individual strain gauges 33. The design and layout of individual strain gauges 33 on strain gauge 31 may be made so as to make strain gauge 31 sensitive to forces (Ft, Fs) in the radial direction and force Fn in the axial direction while minimizing sensitivity to rotational force (torque) along the rotation angle ø.

Figure 12:
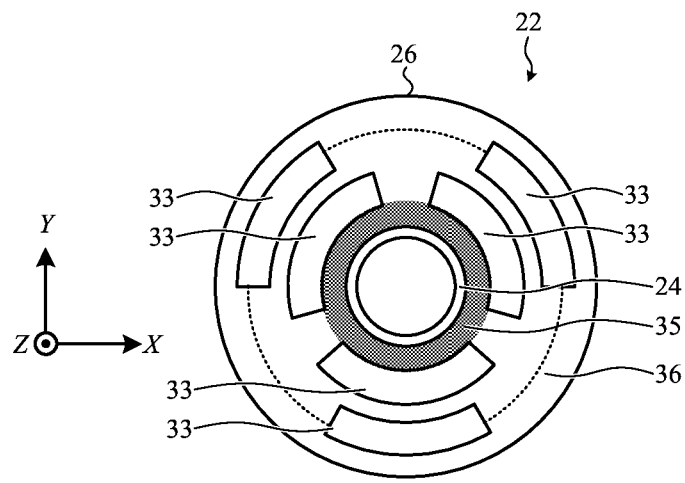
FIG. 12 illustrates a strain gauge assembly when axial force is exerted by the stylus.

Referring to FIG. 12, a top view of strain gauge 31 shows the effect of axial force on strain gauge 31. That is, the portion 35 of strain gauge 31 adjacent to hollow core portion 24 senses evenly distributed force in the area immediately surrounding hollow core portion 24 as sensed by strain gauges 33. This is due to the force Fn exerted by user 12 in the downward axial direction along stylus 14 as he or she moves tip 16 across screen 13 on portable electronic device 11. An area 36 on the periphery of strain gauge 31 may sense less force in this example because stylus 14 is held more perpendicular to screen 13 (tilt angle θ is small).

In one embodiment, the tilting of stylus 14 on the z axis may be measured as differences in the resistance of various strain gauges 33. As certain of strain gauges 33 are deformed in the x-y directions by a force exerted on stylus tip 16 (for example, stemming from the tip impacting an input surface), their resistances change. By contrast, other strain gauges 33 which are not so deformed may maintain a relatively constant resistance.

Generally, certain of the strain gauges may be compressed or expanded in the x-y direction, and thereby generate a change in resistance. From the measured change in electrical resistance of various strain gauges 33 in the array, the amount of applied stress may be determined using a Wheatstone Bridge. Strain gauges 33 located closer to hollow core portion 24 may sense more z axis (axial force) than radial force in the x-y direction.

Figure 13:
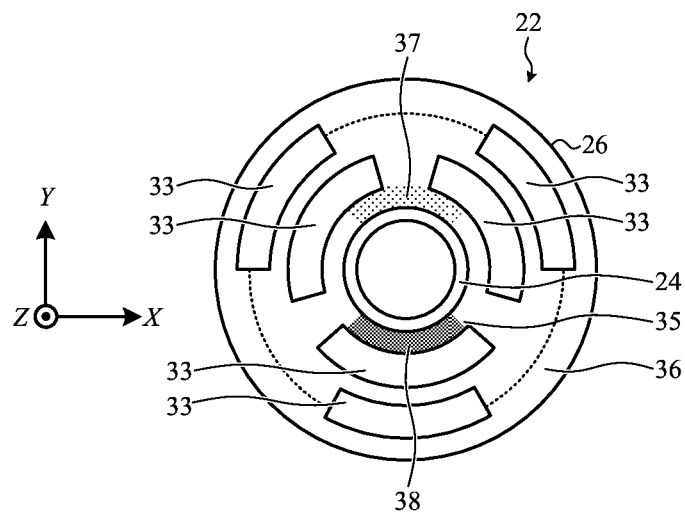
FIG. 13 illustrates a strain gauge assembly when radial force is exerted by the stylus.

Referring to FIG. 13, a top view of strain gauge 31 shows the effect of radial force sensed by strain gauge 31. In this view, the portion 35 of strain gauge 31 adjacent to hollow core portion 24 receives uneven force due to the tilting of stylus 14 (tilt angle θ is larger than in FIG. 12) by user 12 as he or she moves tip 16 across screen 13 on portable electronic device 11. Depending upon the direction and degree θ of tilt of stylus 14, an area generally indicated by reference numeral 37 may sense positive strain or tension while an area generally indicated by reference numeral 38 on the opposite side of hollow core portion 24 may sense negative strain or compression as sensed by strain gauges 33 due to the tilting of stylus 14 by user 12 as he or she moves tip 16 across screen 13. By sensing the positive or negative strain, the tilting angle θ can be measured from axis 15 and the output of stylus 14 in terms of line quality can be adjusted depending upon this measurement.

It should be appreciated that certain functions can be enabled by the amount of sensed force exceeding an input threshold. For example, if an amount of force F is required to activate portable electronic device 11 but user 12 is holding stylus at an angle θ from the z axis 15, the amount of force exerted by user 12 on stylus 14 will be divided into force components along each of the x, y, and z axes. By determining the total amount of force that user 12 exerts in the x, y and z directions combined, a more accurate input can be provided.

Figure 14:
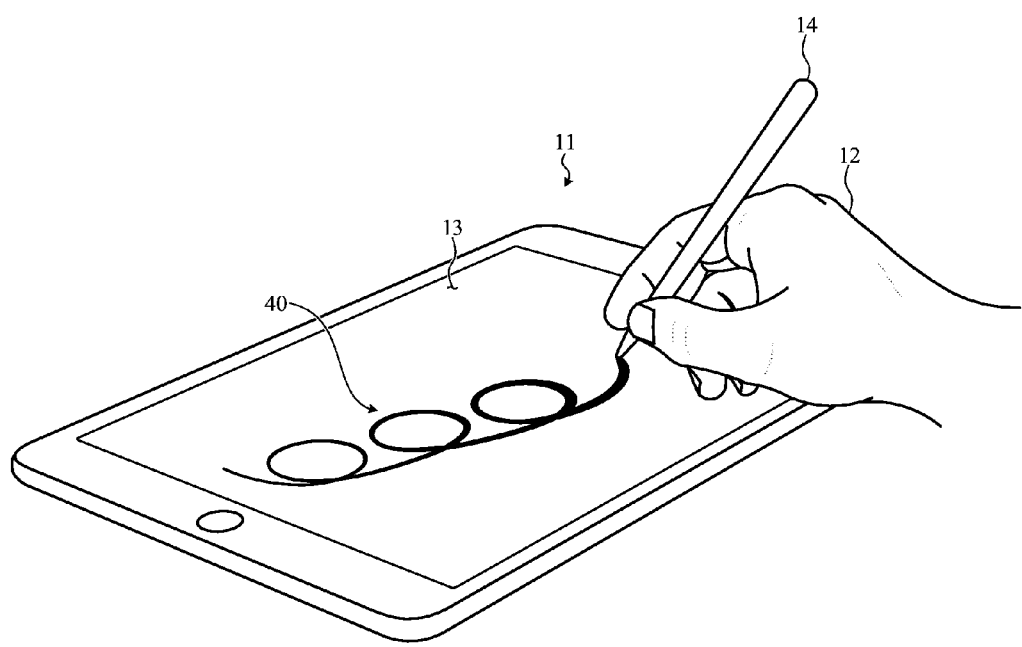
FIG. 14 illustrates use of a sample stylus with a touch- and/or force-sensitive surface.

Referring to FIG. 14, the effects of uneven force exerted by a user due to the tilting of stylus 14 by user 12 as he or she moves tip 16 across screen 13 on portable electronic device 11 may be seen. In this embodiment, user 12 may be trying to draw a series of connected circles 40 on screen 13. Because of the tilting of stylus 14 by user 12 and because of uneven force exerted by user, the quality of a line 39 may vary from one area to another. For example, generally, user 12 exerts more force pushing stylus away from his or her person in the direction indicated by arrow 41 than he or she does moving stylus toward his or her person in the direction indicated by arrow 42. In the lateral directions indicated by arrows 43, user 12 may exert even less force on stylus 14 against screen 13.

The effect of this uneven force is that the quality of line 39 varies from one portion of screen 13 to another. Portions 44 on the left side of circles 40 may be lighter because user 12 has exerted less force on stylus 14 when drawing stylus 14 toward him or her while portions 45 on the right side of circles 40 may be darker because user 12 has exerted more force pushing stylus 14 away from him or her. In some situations, the force exerted on screen 13 may be such that no line 39 is visible on certain portions of screen 13. This effect on handwriting or mechanical or artistic drawing can be significant and result in unsatisfactory performance of portable electronic device 11 as perceived by user 12. By allowing force sensor 31 to compensate for variations in the amount of force exerted by user 12 on screen 13, in one embodiment, the quality of line 39 on screen 13 may be adjusted so as to be more uniform. The electrical signals received by controller 10 in portable electronic device 11 may be adjusted in accordance with signals received from force sensor 31 in stylus 14 so as to compensate for uneven applied force which would otherwise vary the visual characteristic of line 39. A more uniform image on screen 13 may thus be generated.

While the disclosure has described various embodiments, it should be expressly understood to those of ordinary skill in the art that certain modifications may be made without departing from the spirit or scope of this disclosure. For example, while various configurations have been disclosed for a stylus to enable various applications for texture capture, additional capabilities may be employed without departing from the spirit or scope of the disclosure. Accordingly, the proper scope of this disclosure is set forth in the following claims.

We claim:

1. A stylus, comprising:
    a housing;
    a tip portion at an end of the housing; and
    a force sensing device electrically connected with the tip portion to sense forces exerted on the tip portion in axial and radial directions, the force sensing device comprising:
        a first membrane extending radially from the housing to the tip portion; and
        a second membrane, axially separated from the first membrane and extending radially from the housing to the tip portion;
    wherein the force sensing device comprises a set of strain gauges on the first membrane, each of the set of strain gauges sensitive to axial and radial forces.

2. The stylus of claim 1, further including a controller electrically associated with the force sensing adjust output of a touch-sensitive surface associated with the stylus.

3. The stylus of claim 2 further including a transmitting device for sending an input to said controller.

4. The stylus according to claim 1 wherein the first membrane and the second membrane are each fixed to the housing.

5. The stylus of claim 1 wherein the second membrane includes cut out portions that extend axially through the second membrane.

6. A system comprising:
    a portable electronic device;
    a display screen associated with the portable electronic device;
    a stylus electrically connected to the portable electronic device, the stylus including:
        a tip portion associated with the stylus;
        a force sensing device associated with the tip portion, and comprising at least one set of strain gauges operative to sense three dimensional components of force exerted on the display screen by the tip portion, the force sensing device comprising:
            a first membrane radially connected to the tip portion with a first connection; and
            a second membrane radially connected to the tip portion with a second connection, wherein the first connection and the second connection are separated by an axial gap;
        a controller associated with the portable electronic device;
        a transmitting device electrically connected to the force sensing device for providing the three dimensional force components to the controller; and
        the controller providing signals to the display screen;
        whereby the controller adjusts an output of the screen in response to the three dimensional force components.

7. The system of claim 6 wherein said force sensing device includes a strain gauge adjacent said stylus.

8. The system according to claim 6 wherein said first membrane includes the strain gauges.

9. The system according to claim 6 wherein said second membrane includes cut out portions.

10. A method for displaying an image on an electronic device comprising the steps of:
    moving a stylus over the electronic device;
    measuring, using at least one strain gauge sensitive to both axial and radial forces acting on a tip of the stylus, three dimensional force components exerted by the stylus on the electronic device, the forces being transmitted from the tip to first and second membranes that are axially separated and extending radially from a housing of the stylus to the tip, one of the membranes supporting the at least one strain gauge;
    transmitting the measured force components to the electronic device; and
    adjusting the image based upon the measured force components.

11. The method of claim 10 wherein said step of adjusting includes turning said electronic device on or off.

12. The method of claim 10 wherein said step of adjusting includes varying a visual characteristic of said image.

* * * * *